(12) United States Patent
Sato et al.

(10) Patent No.: US 9,084,033 B2
(45) Date of Patent: Jul. 14, 2015

(54) OPTICAL CROSS-CONNECT APPARATUS

(71) Applicants:NATIONAL UNIVERSITY CORPORATION NAGOYA UNIVERSITY, Nagoya-shi, Aichi-ken (JP); NEC CORPORATION, Tokyo (JP)

(72) Inventors: Ken-ichi Sato, Nagoya (JP); Hiroshi Hasegawa, Nagoya (JP); Yuto Iwai, Nagoya (JP)

(73) Assignees: NATIONAL UNIVERSITY CORPORATION NAGOYA UNIVERSITY, Nagoya (JP); NEC CORPORATION, Tokyo (JP)

( * ) Notice: Subject to any disclaimer, the term of this patent is extended or adjusted under 35 U.S.C. 154(b) by 134 days.

(21) Appl. No.: 13/788,182

(22) Filed: Mar. 7, 2013

(65) Prior Publication Data

US 2014/0029944 A1    Jan. 30, 2014

(30) Foreign Application Priority Data

Jul. 27, 2012 (JP) ................................. 2012-167691

(51) Int. Cl.
*H04J 14/00* (2006.01)
*H04Q 11/00* (2006.01)

(52) U.S. Cl.
CPC .......... *H04Q 11/0005* (2013.01); *H04Q 11/00* (2013.01)

(58) Field of Classification Search
CPC ..... H04J 1/00; H04J 2011/00; H04J 2203/00; H04J 2211/00; H04Q 1/00; H04Q 2011/00; H04Q 2201/00; H04Q 2209/00; H04Q 2213/00; H04Q 11/0005; H04Q 11/00; G02B 1/00; G02B 2003/00; G02B 2207/00

USPC .......................................................... 398/50
See application file for complete search history.

(56) References Cited

U.S. PATENT DOCUMENTS 6,335,992 B1 * 1/2002 Bala et al. ........................ 385/17
7,120,328 B2 * 10/2006 Testa et al. ...................... 385/17

(Continued)

FOREIGN PATENT DOCUMENTS

JP     A-2008-252664      10/2008

OTHER PUBLICATIONS

Panda, Manoj K.; Venkatesh, T.; Sridhar, V.; Singh, Yatindra N., "Architecture for a class of scalable optical cross-connects," Broadband Networks, 2004. BroadNets 2004. Proceedings. First International Conference on , vol., no., pp. 233,242, Oct. 25-29, 2004.*

(Continued)

*Primary Examiner* — Ken Vanderpuye
*Assistant Examiner* — Jose Luis F Pugeda
(74) *Attorney, Agent, or Firm* — Oliff PLC

(57) ABSTRACT

An optical cross-connect apparatus includes: a plurality of optical cross-connect portions each having an inter-node connection input port and an inter-node connection output port respectively connected to each of the plurality of the inter-node connection optical fibers, an internal connection input port, and an internal connection output port, wherein for each of the plurality of the optical cross-connect portions, the internal connection output port of a predetermined optical cross-connect portion is directly connected to the internal connection input port of another optical cross-connect portion, or the internal connection output port of a predetermined optical cross-connect portion is directly connected to the internal connection input port of another optical cross-connect portion and is indirectly connected via the another optical cross-connect portion to the internal connection input port of yet another optical cross-connect portion.

19 Claims, 12 Drawing Sheets

(56) References Cited

U.S. PATENT DOCUMENTS

| | | | |
|---|---|---|---|
| 7,983,560 B2* | 7/2011 | Maki et al. | 398/50 |
| 8,018,927 B2* | 9/2011 | Jakel et al. | 370/386 |
| 2004/0153492 A1* | 8/2004 | Cao et al. | 709/200 |
| 2006/0098981 A1* | 5/2006 | Miura et al. | 398/45 |
| 2006/0140625 A1* | 6/2006 | Ooi et al. | 398/19 |
| 2007/0183777 A1* | 8/2007 | Peloso et al. | 398/45 |
| 2008/0013947 A1* | 1/2008 | Peloso et al. | 398/5 |
| 2008/0056715 A1* | 3/2008 | Akiyama et al. | 398/45 |
| 2008/0138068 A1* | 6/2008 | Akiyama et al. | 398/50 |
| 2008/0181605 A1* | 7/2008 | Palacharla et al. | 398/50 |
| 2009/0232497 A1* | 9/2009 | Archambault et al. | 398/50 |
| 2010/0014863 A1* | 1/2010 | Zami et al. | 398/79 |

OTHER PUBLICATIONS

Iwai et al., "Large-Capacity Photonic Node Architecture that Utilizes Stacked Small Scale Optical Cross-connects," *Proceedings of the 2012 IEICE General Conference*, Mar. 20-23, 2012, p. 484 (w/ translation).

* cited by examiner

OPTICAL CROSS-CONNECT APPARATUS

CROSS REFERENCE TO RELATED APPLICATION

The present application claims the benefits of Japanese Patent Application No. 2012-167691 filed on Jul. 27, 2012, the disclosure of which is herein incorporated by reference in its entirety.

BACKGROUND OF THE INVENTION

1. Field of the Invention

The present invention relates to an optical cross-connect apparatus disposed in an optical network and capable of outputting input wavelength division multiplexing light from a desired output port on the basis of a wavelength group or a wavelength.

2. Description of the Related Art

An optical network is known that transmits wavelength division multiplexing (WDM) light acquired by multiplexing a plurality of wavelength paths formed by combining optical signals of a predetermined bit rate on the order of GHz to THz for each of a plurality of wavelengths respectively corresponding to a plurality of wave channels (or light paths) divided by, for example, 100 GHz in a predetermined wavelength range from a predetermined optical node to a plurality of other optical nodes through pluralities of optical input fibers (e.g., m fibers) and optical output fibers (e.g., n fibers) (the number of fibers may be constant or inconstant between optical nodes) in a concurrent manner among the optical nodes. The number of the optical input fibers, for example, m, includes the number of optical fibers from a plurality of optical nodes, and the number of the optical output fibers, for example, n, includes the number of optical fibers to a plurality of optical nodes. In such an optical network, an optical cross-connect apparatus making up each optical node performs routing of wavelength division multiplexing optical signals transmitted through optical fibers on the basis of a wavelength directly in the form of optical signals, thereby implementing high-capacity transmission with low power consumption. For example, this corresponds to an optical cross-connect apparatus described in Japanese Laid-Open Patent Publication No. 2008-252664.

Since a traffic amount is predicted to increase at an accelerated rate in optical networks due to the recent spread of ADSL and FTTH and the spread of services such as distribution of high-definition moving images, it is desired to increase the numbers of wavelength paths and optical fibers, i.e., to further increase a scale of the optical cross-connect apparatuses making up the optical nodes.

Although, for example, the conventional optical cross-connect apparatus described in Japanese Laid-Open Patent Publication No. 2008-252664 uses a wavelength-selecting switch (WSS) in its configuration, the scale thereof is limited up to about 1-by-20 and a large-scale optical cross-connect apparatus is difficult to configure. Specifically, the wavelength-selecting switch (WSS) used in the optical cross-connect apparatus is functioned as, for example, a wave separator by employing a configuration selecting a wavelength from wavelength division multiplexing light by using a diffraction grating dispersing the light output from one end surface of a plurality of optical fibers, a condensing lens condensing the light dispersed by the diffraction grating onto MEMS mirrors of the same number as the separated wavelengths, and a three-dimensionally configured spatial optical system causing the light selectively reflected by the MEMS mirrors to be incident on one of end surfaces of a plurality of optical fibers through the condensing lens and the diffraction grating and, therefore, since the increased number of output ports not only makes the wavelength-selecting switch expensive because of the necessity of high-precision processing but also causes a greater increase in optical loss, the largest number of the ports is limited up to about 20 in existing wavelength-selecting switches, and it is practically difficult to implement a larger scale of the optical cross-connect apparatus. Although a 1-by-9 wavelength-selecting switch is frequently used in reality, even this requires a cost of about one million yen per switch.

For example, respective optical cross-connect apparatuses depicted in FIGS. 16, 17, and 18 are proposed for the optical nodes. An optical cross-connect apparatus OXC of FIG. 16 is configured based on a wavelength-selecting switch and, for example, when the number d of adjacent optical nodes is four, the optical cross-connect apparatus OXC includes 4m 1-by-4n wavelength-selecting switches WSS disposed respectively for 4m optical input fibers Fi1 to Fi4m and selecting a wavelength toward an arbitrary optical output fiber of a plurality of (4n) optical output fibers Fo1 to Fo4n from the wavelengths making up wavelength division multiplexing light from each of the optical input fibers Fi1 to Fi4m, and 4n 4m-by-1 wavelength-selecting switches WSS disposed respectively for a plurality of the (4n) optical output fibers Fo1 to Fo4n and combining and outputting a group of wavelengths output respectively from the 4m 1-by-4n wavelength-selecting switches WSS to a desired optical output fiber to which the group of wavelengths are directed out of a plurality of the (4n) optical output fibers Fo1 to Fo4n. The optical cross-connect apparatus OXC depicted in FIG. 16 has the 4m-by-1 wavelength-selecting switches WSS configured in the same way as the 1-by-4n wavelength-selecting switches WSS and used in the opposite direction, and is configured into a symmetric structure capable of fulfilling the same function even if input/output is reversed. An optical cross-connect apparatus OXC depicted in FIG. 17 is configured in the same way as the optical cross-connect apparatus OXC depicted in FIG. 16 except that the 4m 1-by-4n wavelength-selecting switches WSS are made up of 4m photocouplers PC. An optical cross-connect apparatus OXC depicted in FIG. 18 is configured in the same way as the optical cross-connect apparatus OXC depicted in FIG. 16 except that the 4n 4m-by-1 wavelength-selecting switches WSS are made up of 4n 4m-by-1 photocouplers PC. Although the number of input fibers from an adjacent node or output fibers to an adjacent node is uniformly m or n in the example of this description, a value of m or n may be different for each adjacent node.

If the optical cross-connect apparatus switches a route on the basis of a wavelength group or switches a route on the basis of a wavelength, for example, when it is assumed that the number m of the optical input fibers Fit to Fi4m is 28 and that the number n of the output fibers Fo1 to Fo4n is 28, the 28-by-28 optical cross-connect apparatus OXC depicted in FIG. 16 requiring the 4m 1-by-4n wavelength-selecting switches WSS and the 4n 1-by-4m wavelength-selecting switches WSS requires 56 1-by-28 wavelength-selecting switches WSS; the 28-by-28 optical cross-connect apparatus OXC depicted in FIG. 17 requiring the 4m 1-by-4n photocoupler apparatuses and the 4n 1-by-4m wavelength-selecting switches WSS requires 28 1-by-28 wavelength-selecting switches WSS; and the 28-by-28 optical cross-connect apparatus OXC depicted in FIG. 18 requiring the 4m 1-by-4n wavelength-selecting switches WSS and the 4n 1-by-4m photocoupler apparatuses requires 28 1-by-28 wavelength-selecting switches WSS.

Since a larger scale of the 1-by-28 wavelength-selecting switches WSS is difficult to create, for example, the 28 1-by-28 wavelength-selecting switches WSS in the optical cross-connect apparatuses OXC depicted in FIGS. 17 and 18 may be configured by using four realistic 1-by-9 wavelength-selecting switches WSS for each switch as depicted in FIG. 8, for example. The wavelength-selecting switch WSS depicted in FIG. 8 is 1-by-33 and is utilized as required and used as a 1-by-28 switch.

However, even the configuration requires as many as 4×28, i.e., 112, 1-by-9 wavelength-selecting switches WSS as a whole and causes a high cost of about 112 million yen, which is less practical.

SUMMARY OF THE INVENTION

The present invention was conceived in view of the situations and it is therefore an object of the present invention to provide an optical cross-connect apparatus having a route switching function in an optical node in an optical network and having a significantly smaller hardware scale.

Means for Solving the Problems

To achieve the object, the present invention provides (a) an optical cross-connect apparatus disposed in an optical node in an optical network with optical nodes connected to each other via each of a plurality of inter-node connection optical fibers, comprising: (b) a plurality of optical cross-connect portions each having inter-node connection input ports and inter-node connection output ports respectively connected to the plurality of the inter-node connection optical fibers, internal connection input ports, and internal connection output ports, wherein (c) for each of the plurality of the optical cross-connect portions, each of the internal connection output ports of a predetermined optical cross-connect portion is directly connected to one of the internal connection input ports of another optical cross-connect portion, or each of the internal connection output ports of a predetermined optical cross-connect portion is directly connected to one of the internal connection input ports of another optical cross-connect portion and is indirectly connected via the another optical cross-connect portion to one of the internal connection input ports of yet another optical cross-connect portion.

The Effects of the Invention

The optical cross-connect apparatus of the present invention configured as described above includes a plurality of the optical cross-connect portions respectively having the inter-node connection input ports and the inter-node connection output ports respectively connected to the plurality of the inter-node connection optical fibers, and the internal connection input ports and the internal connection output ports, for each of a plurality of the optical cross-connect portions, each of the internal connection output ports of a predetermined optical cross-connect portion is directly connected to one of the internal connection input ports of another optical cross-connect portion, or each of the internal connection output ports of a predetermined optical cross-connect portion is directly connected to one of the internal connection input ports of another optical cross-connect portion and is indirectly connected via the another optical cross-connect portion to one of the internal connection input ports of yet another optical cross-connect portion. Therefore, since a detour can be made for routing among the optical cross-connect portions, the scale of hardware such as the optical cross-connect portions or the wavelength-selecting switches can significantly be reduced while the same degree of path accommodation capacity is included as compared to a conventional optical cross-connect apparatus by the same numbers of the input and output fibers.

Preferably, in a pair of optical cross-connect portions adjacent to each other out of the plurality of the optical cross-connect portions, one of the internal connection output ports of one optical cross-connect portion is connected to one of the internal connection input ports of the other optical cross-connect portion, and one of the internal connection output ports of the other optical cross-connect portion is connected to one of the internal connection input ports of the one optical cross-connect portion. Consequently, as a result, for each of a plurality of the optical cross-connect portions, each of the internal connection output ports of a predetermined optical cross-connect portion is directly connected to one of the internal connection input ports of another optical cross-connect portion, or each of the internal connection output ports of a predetermined optical cross-connect portion is directly connected to one of the internal connection input ports of another optical cross-connect portion and is indirectly connected via the another optical cross-connect portion to one of the internal connection input ports of yet another optical cross-connect portion and, therefore, the scale of hardware such as the optical cross-connect portions or the wavelength-selecting switches can significantly be reduced as compared to a conventional optical cross-connect apparatus having the same degree of path accommodation capacity.

Preferably, the optical cross-connect apparatus is made up of two or more optical cross-connect portions. Consequently, the optical cross-connect portions are connected via the connection fibers in a ring shape and a wavelength output from an internal connection output port of a predetermined optical cross-connect portion can be transmitted to a pair of adjacent optical cross-connect portions to each other among the optical cross-connect portions connected in a ring shape.

The number of the optical cross-connect portions disposed in the optical cross-connect apparatus may be identical to the number of other nodes adjacent to the optical node disposed with the optical cross-connect apparatus.

Preferably, the plurality of the optical cross-connect portions is configured by using wavelength-selecting switches having a spectral element dispersing wavelength division multiplexing light to each wavelength and a MEMS mirror or an LCOS (Liquid Crystal on Silicon) receiving and selectively input a wavelength dispersed by the spectral element to any of a plurality of fibers. Consequently, this advantageously decreases the number of elements and reduces the relative scale as compared to an optical cross-connect portion made up of wave separators disposed for respective optical input fibers and separating wavelength division multiplexing light into respective wavelengths, 1-by-n optical switches of the same number as the wavelengths switching the routes of optical paths separated by the wave separator for each wavelength, and 1-by-n wave combiners disposed for respective optical output fibers and receiving and combining the wavelengths subjected to the route switching by the 1-by-n optical switches for output to the optical output fibers.

Preferably, the plurality of the optical cross-connect portions has a plurality of photocouplers respectively connected to the inter-node connection input ports and the internal connection input ports, and output-side wavelength-selecting switches respectively connected to the inter-node connection output ports and the internal connection output ports and receiving the wavelength division multiplexing light from the photocouplers to select and selectively output wavelengths included in the wavelength division multiplexing light to the inter-node connection output ports and the internal connection output ports. In addition, preferably, the plurality of the optical cross-connect portions has a plurality of input-side wavelength-selecting switches respectively connected to the inter-node connection input ports and the internal connection input ports and receiving input wavelength division multiplexing light to select wavelengths included in the wavelength division multiplexing light, and photocouplers respectively connected to the inter-node connection output ports and the internal connection output ports and receiving and respectively outputting wavelengths selected by the input-side wavelength-selecting switches to the inter-node connection output ports and the internal connection output ports. Consequently, the number of wavelength-selecting switches can be reduced to half.

Preferably, the plurality of the optical cross-connect portions has a plurality of input-side wavelength-selecting switches respectively connected to the inter-node connection input ports and the internal connection input ports, and output-side wavelength-selecting switches respectively connected to the inter-node connection output ports and the internal connection output ports and receiving and selectively outputting wavelengths selected by the input-side wavelength-selecting switches to the inter-node connection output ports and the internal connection output ports. Consequently, the optical loss in the optical cross-connect portion is reduced because no photocoupler is used.

Preferably, the wavelength division multiplexing light includes wavelength channels having signal bit rates different from each other. This increases the versatility of the optical cross-connect apparatus.

Preferably, the wavelength division multiplexing light includes wavelength channels of wavelengths having different wavelength intervals. This increases the versatility of the optical cross-connect apparatus.

DESCRIPTION OF THE PREFERRED EMBODIMENTS

Embodiments of the present invention will now be described in detail with reference to the drawings.

[First Embodiment]

Figure 1:
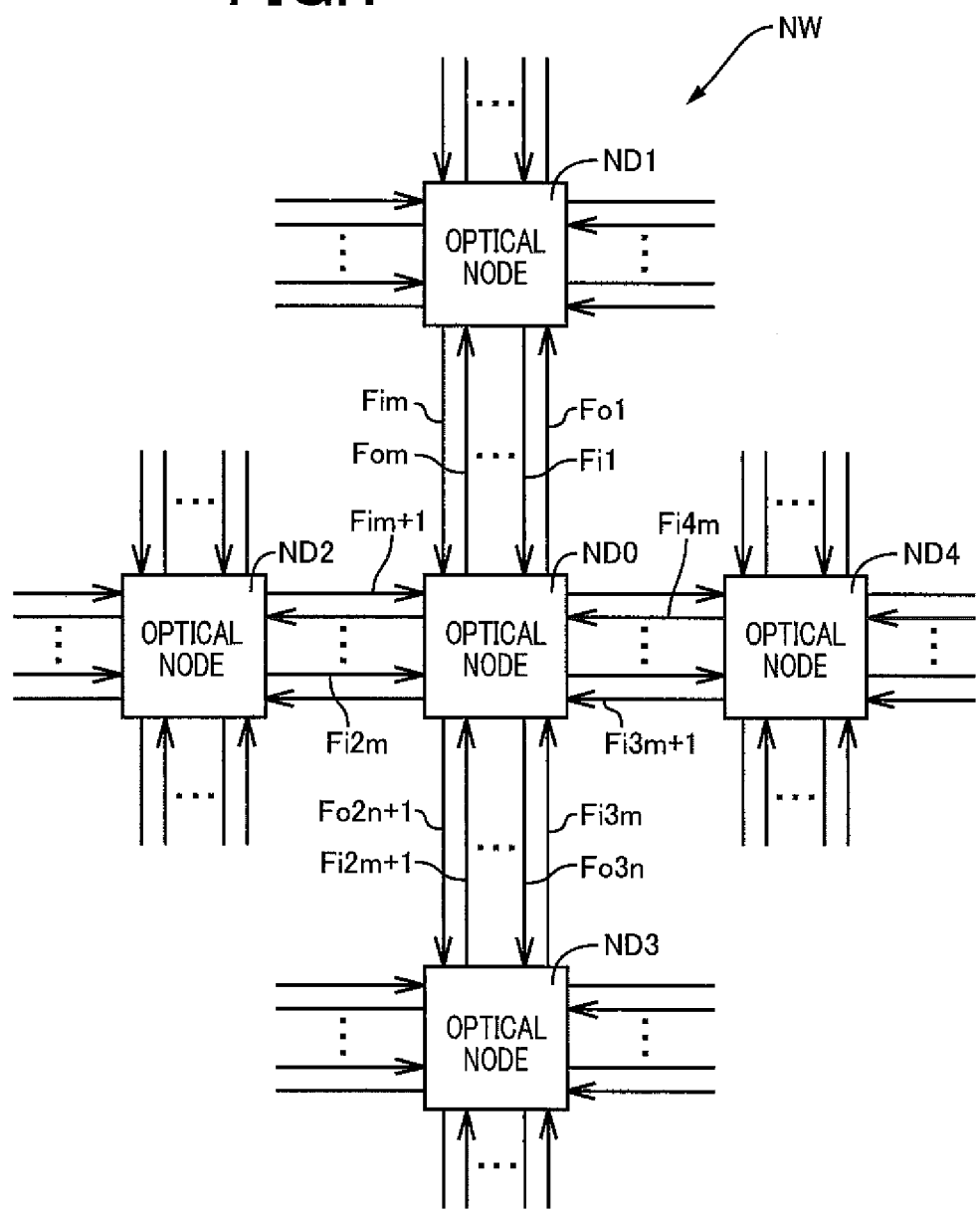
FIG. 1 is a schematic that illustrates an example of an optical network connected with optical fibers between optical nodes which the optical cross-connect apparatus that is one embodiment of the present invention is used.

FIG. 1 depicts a portion of an optical network NW made up of a plurality of optical nodes ND0 to NDd and optical fibers F connecting the nodes. The suffix "d" denotes a positive integer indicative of the number of optical nodes adjacent to the optical node ND0 and is four in this embodiment. The number of fibers between adjacent nodes may not be constant. Since the optical nodes ND0 to ND4 are configured in the same way, the optical node ND0 will hereinafter be described as a representative.

Figure 2:
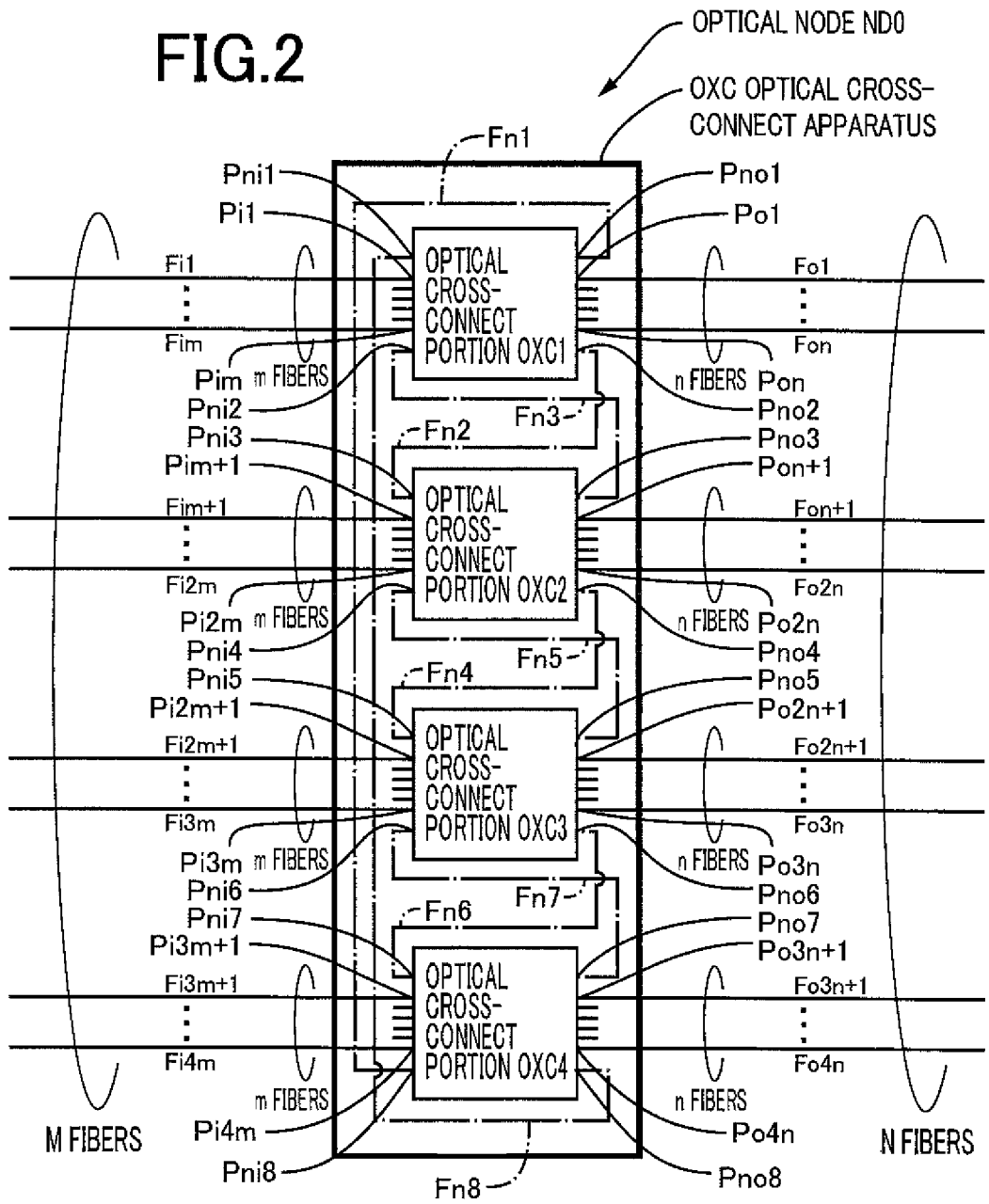
FIG. 2 is a view that illustrates a function of the optical cross-connect apparatus making up the optical nodes in the optical network of FIG. 1.

As depicted in FIG. 2, an optical cross-connect apparatus OXC disposed in the optical node ND0 includes a plurality of optical cross-connect portions (sub-system portions) OXC1 to OXC4 to the number required for accommodating the number of input fibers connected to the optical node ND0 from the other adjacent optical nodes ND 1 to ND4 or the number of optical fibers connected to the other optical nodes. FIG. 2 depicts input/output connection of the optical cross-connect apparatus OXC and internal connection among the optical cross-connect portions OXC1 to OXC4 in the optical cross-connect apparatus OXC.

On the input side of the optical cross-connect apparatus OXC, a total of M optical input fibers Fi1 to Fim, Fim$^+$1 to Fi2m, Fi2m$^+$1 to Fi3m, and Fi3m$^+$1 to Fi4m are connected from the optical nodes ND1 to NDd adjacent to the optical node ND0. On the output side of the optical cross-connect apparatus OXC, a total of N optical output fibers Fo1 to Fon, Fon$^+$1 to Fo2n, Fo2n$^+$1 to Fo3n, and Fo3n$^+$1 to Fo4n are connected to the optical nodes ND1 to NDd adjacent to the optical node ND0. From the optical input fibers Fi1 to Fim, Fim$^+$1 to Fi2m, Fi2m$^+$1 to Fi3m, and Fi3m$^+$1 to Fi4m, respective wavelength division multiplexing lights are transmitted and input to the optical cross-connect apparatus OXC. The total number of the optical input fibers Fi1 to Fi4m is M; the total number of the optical output fibers Fo1 to Fo4n is N; and the optical input fibers Fi1 to Fi4m and the optical output fibers Fo1 to Fo4n act as inter-node connection optical fibers. In general, N=M is often satisfied.

The optical cross-connect apparatus OXC switches a route (performs routing) for each wavelength group or each wavelength included in the wavelength division multiplexing lights for output to one of the optical output fibers Fo1 to Fon, Fon$^+$1 to Fo2n, Fo2n$^+$1 to Fo3n, and Fo3n$^+$1 to Fo4n.

In this embodiment, one wavelength division multiplexing (WDM) light is configured by combining lights of a plurality of wavelengths respectively corresponding to a plurality of wave channels (or light paths) divided by, for example, 100 GHz in a predetermined wavelength range, and the wavelength division multiplexing light is transmitted through one of the optical fibers in a concurrent manner.

Returning to FIG. 2, with regard to the optical cross-connect portions OXC1 to OXCx making up the optical cross-connect apparatus OXC, x=4 is defined in FIG. 1 and the optical cross-connect apparatus OXC is made up of the four optical cross-connect portions OXC1 to OXC4 of the same number as the optical nodes ND1 to ND4 adjacent to the optical node ND0. The number of the optical cross-connect portions may not be identical to the number of the adjacent optical nodes and can be set independently of the number of the adjacent optical nodes. The optical cross-connect portions OXC1 to OXC4 respectively have inter-node connection input ports Pi1 to Pim, Pim$^+$1 to Pi2m, Pi2m$^+$1 to Pi3m, and Pi3m$^+$1 to Pi4m connected to the optical input fibers Fi1 to Fim, Fim$^+$1 to Fi2m, Fi2m$^+$1 to Fi3m, and Fi3m$^+$1 to Fi4m, respectively, and inter-node connection output ports Po1 to Pon, Pon$^+$1 to Po2n, Po2n$^+$1 to Po3n, and Po3n$^+$1 to Po4n connected to the optical output fibers Fo1 to Fon, Fon$^+$1 to Fo2n, Fo2n$^+$1 to Fo3n, and Fo3n$^+$1 to Fo4n, respectively, for external connection. The optical cross-connect portions OXC1 to OXC4 respectively have internal connection input ports Pni1 to Pni2, Pni3 to Pni4, Pni5 to Pni6, and Pni7 to Pni8, and internal connection output ports Pno1 to Pno2, Pno3 to Pno4, Pno5 to Pno6, and Pno7 to Pno8 for internal connection. Although the optical input fibers Fi1 to Fim from the optical node ND1 may be connected to the inter-node connection input ports Pi1 to Pim of the optical cross-connect portion OXC1, any m fibers of the M fibers in total from the optical nodes ND1 to ND4 may be connected thereto. Similarly, although the optical output fibers Fo1 to Fon to the optical node ND1 may be connected to the inter-node connection output ports Po1 to Pon of the optical cross-connect portion OXC1, any n fibers of the N fibers in total to the optical nodes ND1 to ND4 may be connected thereto.

As depicted in FIG. 2, in the optical cross-connect apparatus OXC, for each of the four optical cross-connect portions OXC1 to OXC4, each of the internal connection output ports of a predetermined optical cross-connect portion is directly connected to one of the internal connection input ports of another optical cross-connect portion, or each of the internal connection output ports of a predetermined optical cross-connect portion is directly connected to one of the internal connection input ports of another optical cross-connect portion and is indirectly connected via the another optical cross-connect portion to one of the internal connection input ports of yet another optical cross-connect portion. For example, in the case of the optical cross-connect portion OXC1, the internal connection input ports Pni1 and Pni2 of the optical cross-connect portion OXC1 are directly connected via internal connection optical fibers Fn8 and Fn3 to the internal connection output port Pno8 of another optical cross-connect portion OXC4 and the internal connection output port Pno3 of another optical cross-connect portion OXC2 and are indirectly connected to the internal connection input ports Pni5 and Pni6 of yet another optical cross-connect portion OXC3 via the another optical cross-connect portion OXC2 and an internal connection optical fiber Fn4 and via the another optical cross-connect portion OXC4 and an internal connection optical fiber Fn7.

In this embodiment, if the optical cross-connect apparatus OXC includes three or more optical cross-connect portions, the connecting methods cause the optical cross-connect portions to be interconnected in a ring shape. As depicted in FIG. 2, the four optical cross-connect portions OXC1 to OXC4 of this embodiment are interconnected in a ring shape. In each pair of optical cross-connect portions adjacent to each other out of the four optical cross-connect portions OXC1 to OXC4 interconnected in a ring shape, one of the internal connection output ports of one optical cross-connect portion is connected to one of the internal connection input ports of the other optical cross-connect portion, and one of the internal connection output ports of the other optical cross-connect portion is connected to one of the internal connection input ports of the one optical cross-connect portion. For example, in a pair of the optical cross-connect portion OXC1 and the optical cross-connect portion OXC2, the internal connection output port Pno2 of one optical cross-connect portion OXC1 is connected via an internal connection optical fiber Fn2 to the internal connection input port Pni3 of the other optical cross-connect portion OXC2, and the internal connection output port Pno3 of the other optical cross-connect portion OXC2 is connected via the internal connection optical fiber Fn3 to the internal connection input port Pni2 of the one optical cross-connect portion OXC1. In a pair of the optical cross-connect portion OXC2 and the optical cross-connect portion OXC3, the internal connection output port Pno4 of one optical cross-connect portion OXC2 is connected via the internal connection optical fiber Fn4 to the internal connection input port Pni5 of the other optical cross-connect portion OXC3, and the internal connection output port Pno5 of the other optical cross-connect portion OXC3 is connected via an internal connection optical fiber Fn5 to the internal connection input port Pni4 of the one optical cross-connect portion OXC2. In a pair of the optical cross-connect portion OXC3 and the optical cross-connect portion OXC4, the internal connection output port Pno6 of one optical cross-connect portion OXC3 is connected via an internal connection optical fiber Fn6 to the internal connection input port Pni7 of the other optical cross-connect portion OXC4, and the internal connection output port Pno7 of the other optical cross-connect portion OXC4 is connected via the internal connection optical fiber Fn7 to the internal connection input port Pni6 of the one optical cross-connect portion OXC3. In a pair of the optical cross-connect portion OXC4 and the optical cross-connect portion OXC1, the internal connection output port Pno8 of one optical cross-connect portion OXC4 is connected via the internal connection optical fiber Fn8 to the internal connection input port Pni1 of the other optical cross-connect portion OXC1, and the internal connection output port Pno1 of the other optical cross-connect portion OXC1 is connected via an internal connection optical fiber Fn1 to the internal connection input port Pni8 of the one optical cross-connect portion OXC4.

As described above, in the optical cross-connect apparatus OXC having the optical cross-connect portion OXC1 to the optical cross-connect portion OXC4 interconnected through the internal connection optical fibers Fn1 to Fn8, a wavelength output from a predetermined optical cross-connect portion of the optical cross-connect portion OXC1 to the optical cross-connect portion OXC4 may be input to any other optical cross-connect portions and, therefore, a route can be switched from any one of the optical input fibers Fi1 to Fim, Fim$^+$1 to Fi2m, Fi2m$^+$1 to Fi3m, and Fi3m$^+$1 to Fi4m to any one of the optical output fibers Fo1 to Fon, Fon$^+$1 to Fo2n, Fo2n$^+$1 to Fo3n, and Fo3n$^+$1 to Fo4n. For example, if a predetermined wavelength included in the wavelength division multiplexing light input via the optical input fiber Fi1 to the optical cross-connect portion OXC1 is subjected to route switching to, for example, the inter-node connection optical output fiber Fo3n, first, the predetermined wavelength is selected in the optical cross-connect portion OXC1 and is output from the internal connection output port Pno2 to the internal connection input port Pni3 of the optical cross-connect portion OXC2. The predetermined wavelength is also selected in the optical cross-connect portion OXC2 and is output from the internal connection output port Pno4 to the internal connection input port Pni5 of the optical cross-connect portion OXC3. The predetermined wavelength is then selected in the optical cross-connect portion OXC3 and is output from the inter-node connection output port Po3n to the optical output fiber Fo3n. As described above, if a plurality of the small-scale optical cross-connect portions OXC1 to OXC4 having the number of input terminals smaller than the number of the optical input fibers and the optical output fibers is used, a predetermined wavelength output from any one of the optical cross-connect portions OXC1 to OXC4 can be input to another optical cross-connect portion to make a detour and the routing can be repeatedly performed in the optical cross-connect portions to achieve the route switching of the predetermined wavelength.

The optical cross-connect apparatus OXC depicted in FIG. 2 is normally disposed as needed with an add wavelength-selecting switch WSS for sending an add signal transmitted from a router of an electric layer at a predetermined wavelength to the wavelength division multiplexing light in a desired predetermined optical output fiber to which the add signal is directed out of the 4n output fibers Fo1 to Fo4n, and a drop wavelength-selecting switch WSS for dropping a drop signal of a predetermined wavelength included in the wavelength division multiplexing light from the 4m optical input fibers Fin1 to Fi4m into a desired router of the electric layer.

Figure 3:
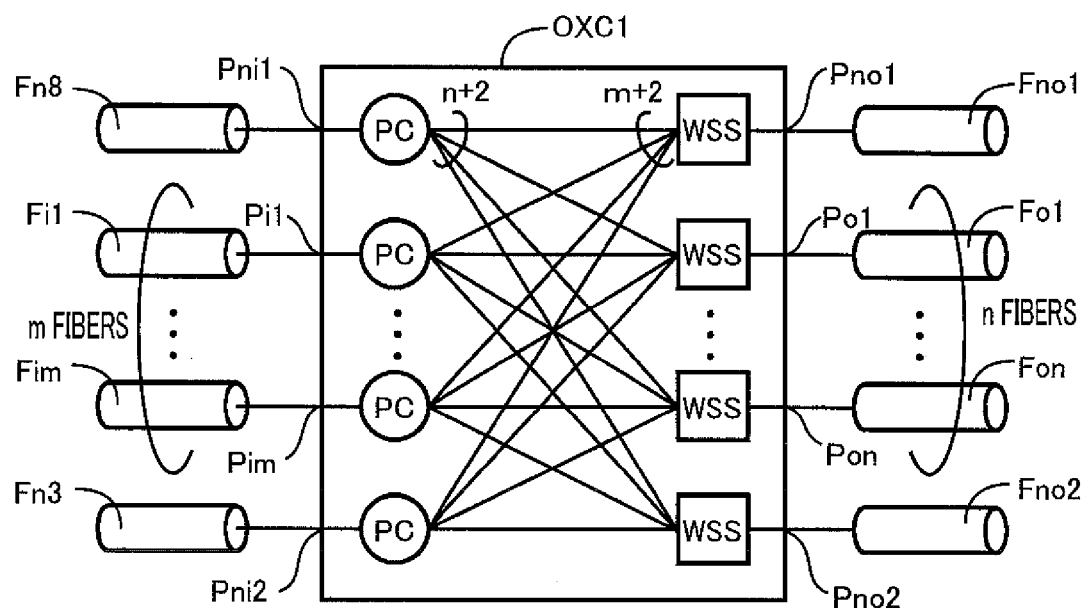
FIG. 3 is a schematic that illustrates the configuration of the main portion of the optical cross-connect apparatus of FIGS. 1 and 2.

Since the four optical cross-connect portions OXC1 to OXC4 have the same configuration, the configuration of the optical cross-connect portion OXC1 will be described as a representative with reference to FIG. 3. In FIG. 3, the optical cross-connect portion OXC 1 includes (m+2) 1-by-(n+2) photocouplers PC and (n+2) 1-by-(m+2) wavelength-selecting switches WSS. A branch coupler with branched optical fibers or waveguides etc., are known as the photocouplers PC. The photocouplers PC branch, distribute, and input respective wavelength division multiplexing lights, wavelength groups, or wavelengths input from the optical input fibers Fi1 to Fim (Fi4), directly to the (n+2) wavelength-selecting switches WSS. The wavelength-selecting switches WSS select and selectively output a predetermined wavelength from the wavelength division multiplexing lights, wavelength groups, or wavelengths distributed from the photocouplers PC to the optical output fibers Fo1 to Fom (Fo4).

Figure 4:
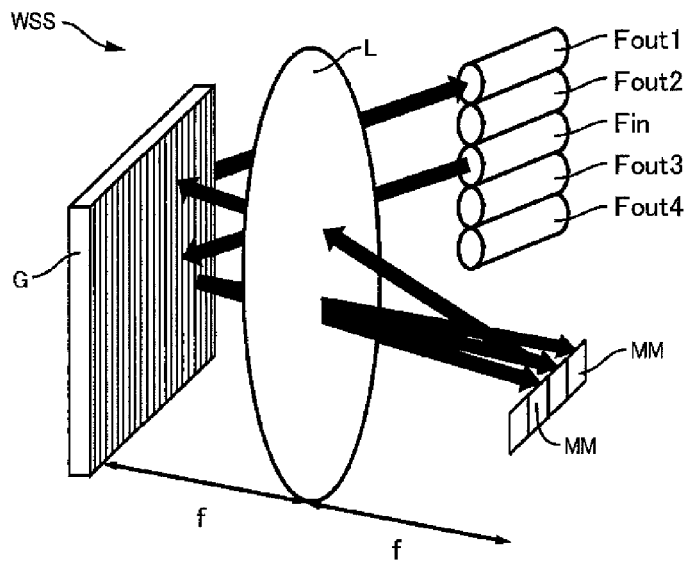
FIG. 4 is a view that illustrates a configuration of a wavelength group-selecting switch used in the optical cross-connect apparatus of FIG. 3.
Figure 5:
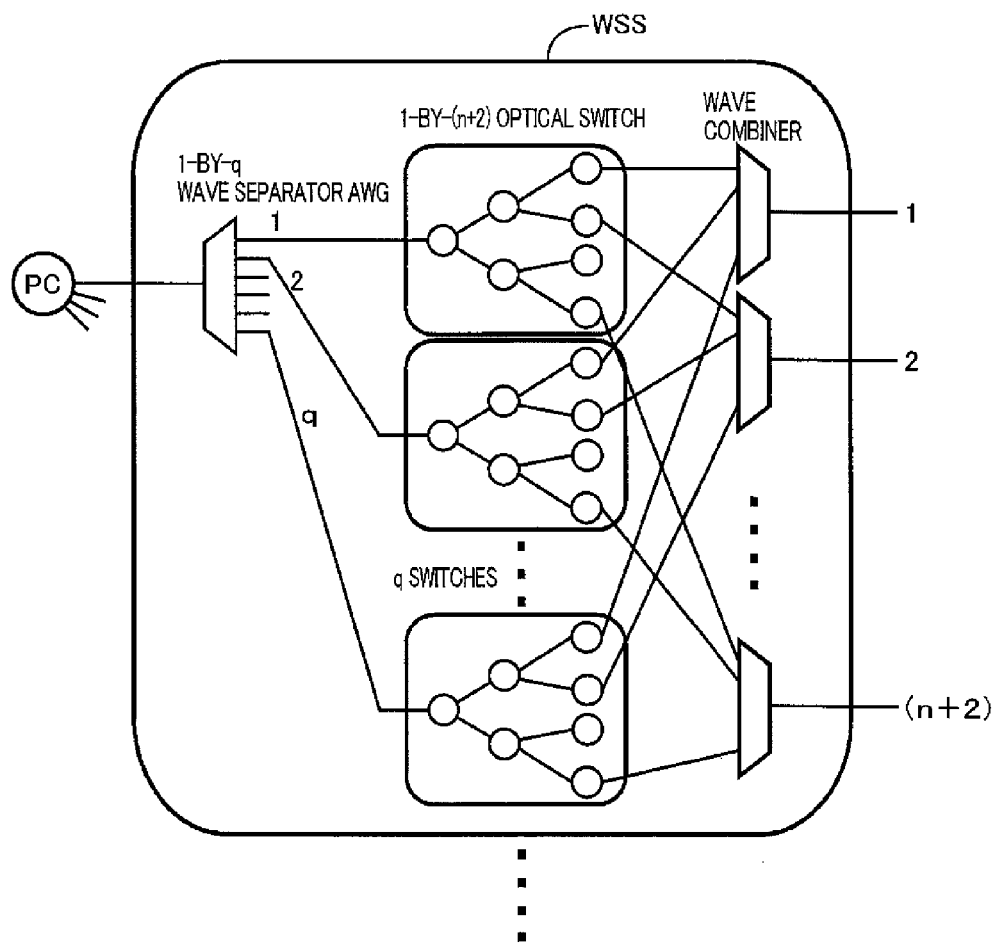
FIG. 5 is a view that illustrates another configuration of the wavelength group-selecting switch used in the optical cross-connect apparatus of FIG. 3.

Each of the wavelength-selecting switches WSS is made up of for example, a three-dimensional MEMS optical switch depicted in FIG. 4, or a planer wavelength-selecting switch depicted in FIG. 5, or an LCOS (Liquid Crystal on Silicon) switch. In FIG. 4, a three-dimensional MEMS optical switch is described in the 1-by-4 or 4-by-1 scale by using one optical input fiber Fin and four optical output fibers Fout1 to Fout4. This three-dimensional MEMS optical switch includes a spectral grating (diffraction grating) G that is a spectral element dispersing the wavelength division multiplexing light input from the optical input fiber Fin on the basis of a wavelength, m (the number of wavelengths, simplified to four in FIG. 6) micromirrors MM subjected to the attitude control by an actuator not depicted, and a condensing lens L disposed therebetween to condense a dispersed wavelength onto one of the micromirrors MM, and is driven such that the wavelength division multiplexing light or wavelength group input from the optical input fiber Fin is dispersed by the spectral grating G on the basis of a wavelength or a wavelength group and is then condensed by the condensing lens L onto the micromirrors MM for respective wavelengths so that a reflected light from the micromirrors MM is incident on a desired fiber of the output fibers Fout1 to Fout4 so as to acquire a wavelength-selecting switch function. A scale up to about 1-by-9 is practically configured with such a three-dimensional MEMS optical switch.

A wavelength-selecting switch WSS depicted in FIG. 5 may be configured as a planer type by integrating waveguides and elements on a common semiconductor or quartz substrate with a planar optical waveguide circuit (PLC) technique, for example. This planer type wavelength-selecting switch WSS is made up of, for example, one 1-by-q (q is the number of wavelengths per fiber) wave separator WS connected to an optical fiber from a photocoupler PC and separating the wavelength division multiplexing light input from the optical fiber into respective wavelengths, q 1-by-(n+2) optical switches PWC switching a route for each wavelength separated by the 1-by-q wave separator WS, and 1-by-q-by-1 wave combiners WC receiving and combing the output wavelengths from the 1-by-(n+2) optical switches PWC for output to n+2 optical output fibers Fo1, Fo2, . . . Fon$^+$2.

Figure 6:
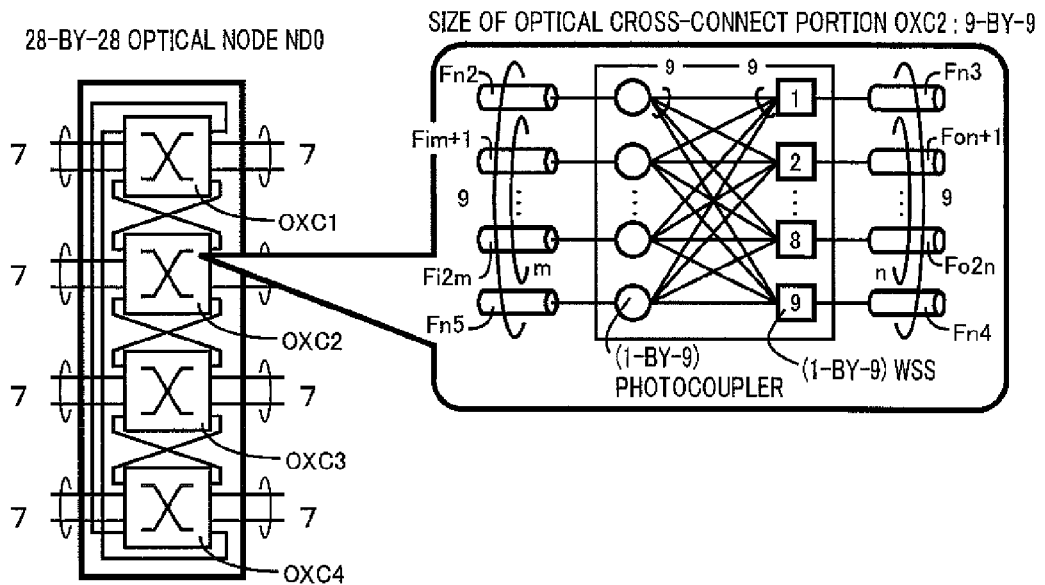
FIG. 6 is a view that illustrates the scale of the optical cross-connect apparatus in the case where the optical cross-connect apparatus of FIGS. 1 and 2 is made up of four optical cross-connect portions which can accommodate seven input optical fibers and seven output optical fibers, and is applied to the optical network.

FIG. 6 depicts an optical node ND0 and an optical cross-connect apparatus OXC included in the optical node ND0, and an optical cross-connect portion OXC2 representative of the configuration of optical cross-connect portions OXC 1 to OXC4 making up the optical cross-connect apparatus OXC, in the case of a network NW having optical nodes including optical nodes ND0 to ND4 connected by a total of 28 input or output fibers, i.e., optical fibers F. In this case, because of m=n=7, both the number of the optical input fibers Fim$^+$1 to Film and the number of the optical output fibers Fon$^+$1 to Fo2n are seven; the two internal connection optical fibers Fn2 and Fn5 are connected on the input side; the two internal connection optical fibers Fn3 and Fn4 are connected on the output side; and, thus, the optical cross-connect portion OXC2 has the 9-by-9 scale. As a result, the optical cross-connect portion OXC2 is made up of nine 1-by-9 photocouplers PC and nine 1-by-9 wavelength-selecting switches WSS. Therefore, the optical cross-connect apparatus OXC is made up of 36 1-by-9 photocouplers PC and 36 1-by-9 wavelength-selecting switches WSS as a whole. As a result, in the optical cross-connect apparatus OXC in this embodiment, the number of required 1-by-9 wavelength-selecting switches WSS is about ⅓ as compared to a conventional optical cross-connect apparatus OXC of FIG. 7.

Figure 7:
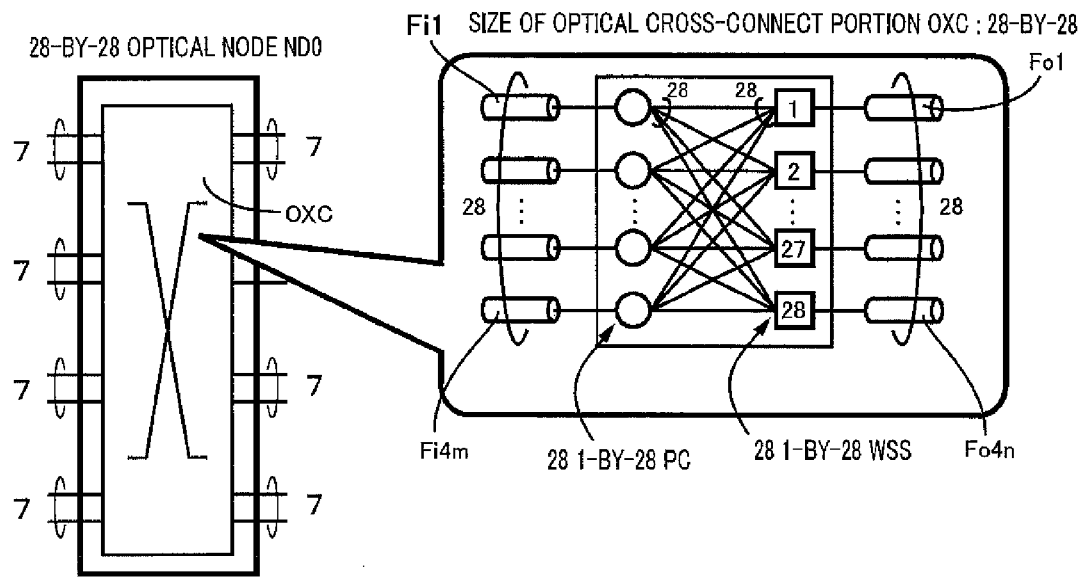
FIG. 7 is a view that illustrates the scale of the optical cross-connect apparatus in the case where the conventional optical cross-connect apparatus that made up of one large-scale optical cross-connect without interconnection is applied to the same optical network as FIG. 6.
Figure 8:
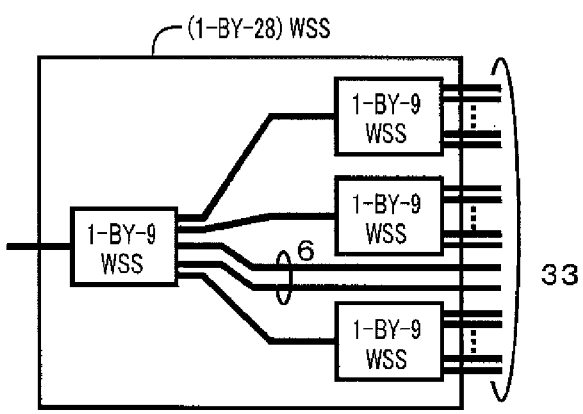
FIG. 8 is a view that illustrates an example in which a plurality of 1-by-28 wavelength-selecting switches WSS in the optical cross-connect apparatus of FIG. 7 is configured by using four 1-by-9 wavelength-selecting switches WSS.

In contrast, in the conventional case that the optical cross-connect apparatus OXC included in the optical node ND0 is made up of a single optical cross-connect portion in the same optical network NW, since no interconnection exists and the scale of the optical cross-connect portion is 28-by-28 as depicted in FIG. 7, the optical cross-connect apparatus OXC is made up of 28 1-by-28 photocouplers PC and 28 1-by-28 wavelength-selecting switches WSS. Since the scale of the 1-by-28 wavelength-selecting switches WSS is unrealistic as described above, if it is attempted to achieve a realistic configuration with the number reduced as far as possible, the 1-by-28 wavelength-selecting switch WSS is configured by using four 1-by-9 wavelength-selecting switches WSS as depicted in FIG. 8. Although the scale in this case is 1-by-33, the necessary ports can be used for using the wavelength-selecting switch WSS in the 1-by-28 scale. The optical cross-connect apparatus OXC with such a conventional configuration requires (4×28=112) 1-by-9 wavelength-selecting switches WSS.

Figure 9:
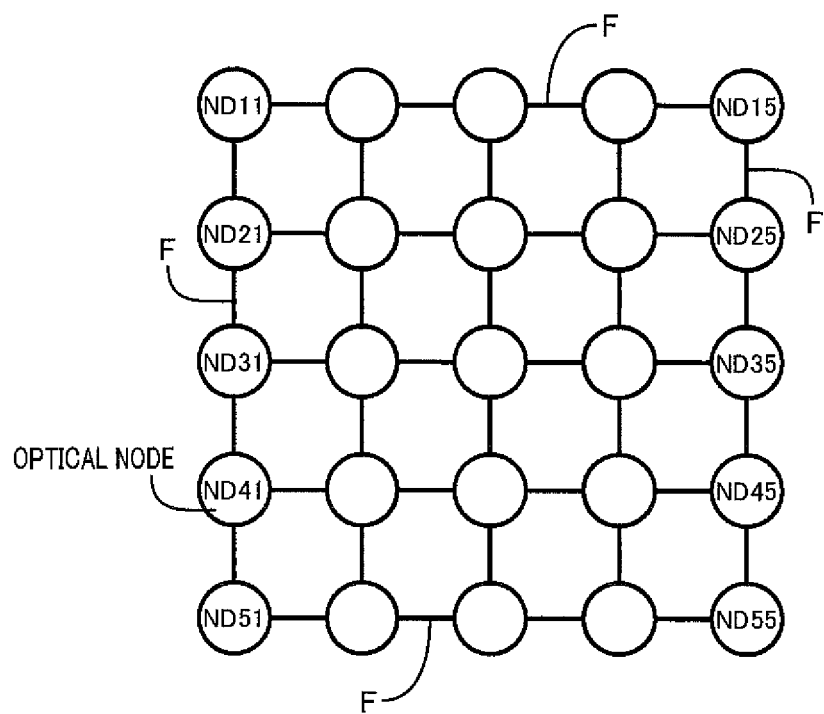
FIG. 9 is a view that illustrates logical composition of the optical network used in simulation that has performed by the inventors.
Figure 10:
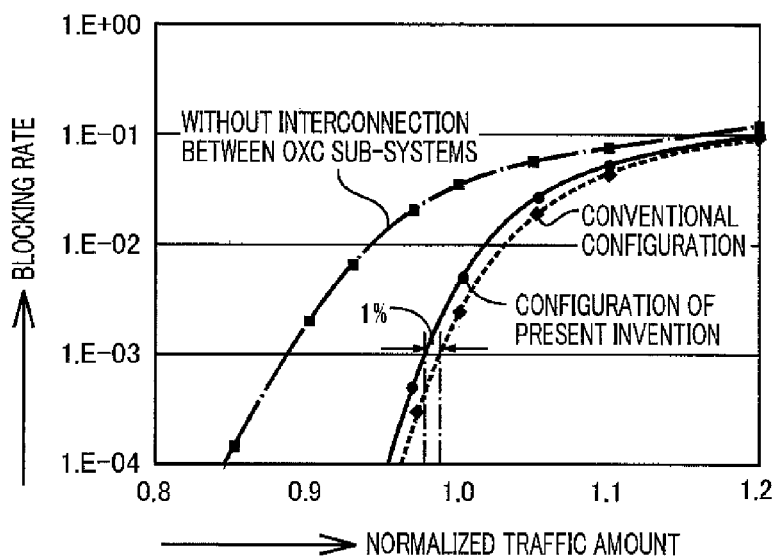
FIG. 10 is a graph that shows the result of simulation for logical composition topology of FIG. 9 in two-dimensional coordinates defined by a horizontal axis indicative of a normalized traffic amount and a vertical axis indicative of a blocking rate (probability).
Figure 11:
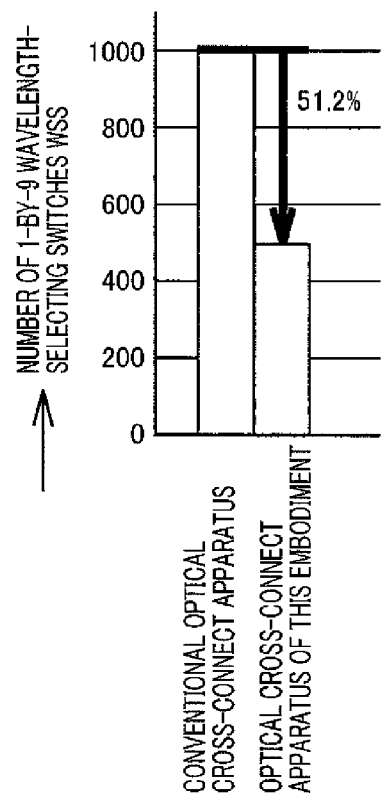
FIG. 11 is a diagram of a result of the required WSS number acquired from simulation for logical composition topology of FIG. 9 in two-dimensional coordinates defined by a horizontal axis indicative of the conventional optical cross-connect apparatus and the optical cross-connect apparatus of this embodiment and a vertical axis indicative of the number of the 1-by-9 wavelength-selecting switches WSS required for network construction.

In a 5-by-5 square grid network NW having 25 optical nodes ND interconnected into a square shape by a plurality of optical fibers F as depicted in FIG. 9, the inventers calculated a blocking ratio (rate) and the number of required 1-by-9 wavelength-selecting switches WSS when the optical cross-connect apparatus OXC of each of the optical nodes ND was made up of a single large-scale optical cross-connect portion (configuration without the OXC sub-system portions), when each of the wavelength-selecting switches WSS consists of a large-scale optical cross-connect made up of a single WSS as depicted in FIG. 7 or FIGS. 16 to 18, for example (conventional configuration), and when a plurality of interconnected optical cross-connect portions is included as depicted in FIG. 8, for example (configuration of the present invention) under the following simulation condition. FIGS. 10 and 11 depict the calculation results.

(Simulation Condition)
Topology: 5-by-5 square grid network (FIG. 9)
Multiplexing light per fiber: multiplexing light of 80 wavelengths
Maximum size of one optical cross-connect portion: 9-by-9
Traffic: inter-node average path demand=14
traffic distribution=uniformly random
occurrence of demand=Poisson distribution FIG. 10 is a graph with the horizontal axis indicative of a traffic amount normalized by defining the inter-node average path demand of "14" as "1" and the vertical axis indicative of a block rate (probability) that is a rate of transmission blocked because a desired wavelength is not available in traffic between optical nodes. In FIG. 10, the configuration of the present invention indicated by a solid line and the conventional configuration indicated by a broken line have significantly lower probability of blocking than the case without connection between OXC sub-systems indicated by a dashed-dotted line. Although the configuration of the present invention indicated by a solid line can accommodate a 1% lower traffic amount at the block rate of 1/1000 as compared to the conventional configuration indicated by a broken line, the results are almost the same between the configurations. However, the number of the 1-by-9 wavelength-selecting switches is reduced to lower than a half, or to be exact, by 51.2%, in the configuration of the present invention indicated by a solid line as compared to the conventional configuration indicated by a broken line as depicted in FIG. 11.

As described above, the optical cross-connect apparatus OXC of this embodiment includes a plurality of the optical cross-connect portions OXC1 to OXC4 respectively having the inter-node connection input ports Pi1 to Pim, Pim$^+$1 to Pi2m, Pi2m$^+$1 to Pi3m, and Pi3m$^+$1 to Pi4m and the inter-node connection output ports Po1 to Pon, Pon$^+$1 to Po2n, Po2n$^+$1 to Po3n, and Po3n$^+$1 to Po4n respectively connected to pluralities of the optical input fibers (inter-node connection optical fibers) Fi1 to Fi4m and the optical output fibers (inter-node connection optical fibers) Fo1 to Fo4n, and the internal connection input ports Pni1 to Pni2, Pni3 to Pni4, Pni5 to Pni6, and Pni7 to Pni8 and the internal connection output ports Pno1 to Pno2, Pno3 to Pno4, Pno5 to Pno6, and Pno7 to Pno8 and, for each of a plurality of the optical cross-connect portions OXC1 to OXC4, each of the internal connection output ports of a predetermined optical cross-connect portion is directly connected to one of the internal connection input ports of another optical cross-connect portion, or each of the internal connection output ports of a predetermined optical cross-connect portion is directly connected to one of the internal connection input ports of another optical cross-connect portion and is indirectly connected via the another optical cross-connect portion to one of the internal connection input ports of yet another optical cross-connect portion. Therefore, since a detour can be made for routing among a plurality of the optical cross-connect portions OXC1 to OXC4, the scale of hardware such as the optical cross-connect portions or the wavelength-selecting switches WSS can significantly be reduced while the same degree of path accommodation capacity is included as compared to a conventional optical cross-connect apparatus without a plurality of optical cross-connect portions interconnected by the same numbers of the input and output fibers.

According to this embodiment, in a pair of optical cross-connect portions adjacent to each other out of a plurality of the optical cross-connect portions OXC1 to OXC4, one of the internal connection output ports of one optical cross-connect portion is connected to one of the internal connection input ports of the other optical cross-connect portion, and one of the internal connection output ports of the other optical cross-connect portion is connected to one of the internal connection input ports of the one optical cross-connect portion and, as a result, for each of a plurality of the optical cross-connect portions, each of the internal connection output ports of a predetermined optical cross-connect portion is directly connected to one of the internal connection input ports of another optical cross-connect portion, or each of the internal connection output ports of a predetermined optical cross-connect portion is directly connected to one of the internal connection input ports of another optical cross-connect portion and is indirectly connected via the another optical cross-connect portion to one of the internal connection input ports of yet another optical cross-connect portion and, therefore, the scale of hardware such as the optical cross-connect portions or the wavelength-selecting switches can significantly be reduced as compared to a conventional optical cross-connect apparatus having the same degree of path accommodation capacity.

The optical cross-connect apparatus OXC of this embodiment is made up of the three or more optical cross-connect portions OXC1 to OXC4. Therefore, the optical cross-connect portions OXC1 to OXC4 are connected via the internal connection optical fibers Fn1 to Fn8 in a ring shape and a wavelength output from an internal connection output port of a predetermined optical cross-connect portion can be transmitted to a pair of adjacent optical cross-connect portions among the optical cross-connect portions connected in a ring shape.

The number of the optical cross-connect portions OXC1 to OXC4 disposed in the optical cross-connect apparatus OXC may be identical to the number of other nodes adjacent to the optical node disposed with the optical cross-connect apparatus OXC.

According to the optical cross-connect apparatus OXC of this embodiment, each of a plurality of the optical cross-connect portions OXC1 to OXC4 is made up of a three-dimensional MEMS optical switch including a spectral grating G that is a spectral element dispersing the wavelength division multiplexing light input from the optical input fiber Fin on the basis of a wavelength, m (the number of wavelengths, simplified to four in FIG. 6) micromirrors MM subjected to the attitude control by an actuator not depicted, and a condensing lens L disposed therebetween to condense a dispersed wavelength onto one of the micromirrors MM, the three-dimensional MEMS optical switch driven such that the wavelength division multiplexing light or wavelength group input from the optical input fiber Fin is dispersed by the spectral grating G on the basis of a wavelength and is then condensed by the condensing lens L onto the micromirrors MM for respective wavelengths so that a reflected light from the micromirrors MM is incident on a desired fiber of the output fibers Fout1 to Fout4 so as to acquire a wavelength-selecting switch function; a planer lightwave circuit wavelength-selecting switch using a PLC (planer lightwave circuit); or an LCOS (Liquid Crystal on Silicon) wavelength-selecting switch. Therefore, this advantageously decreases the number of elements and reduces the relative scale as compared to an optical cross-connect portion made up of wave separators disposed for respective optical input fibers and separating wavelength division multiplexing light into respective wavelengths, 1-by-n optical switches of the same number as the wavelengths switching the routes of optical paths separated by the wave separator for each wavelength, and 1-by-n wave combiners disposed for respective optical output fibers and receiving and combining the wavelengths subjected to the route switching by the 1-by-n optical switches for output to the optical output fibers.

[Second Embodiment]

Figure 12:
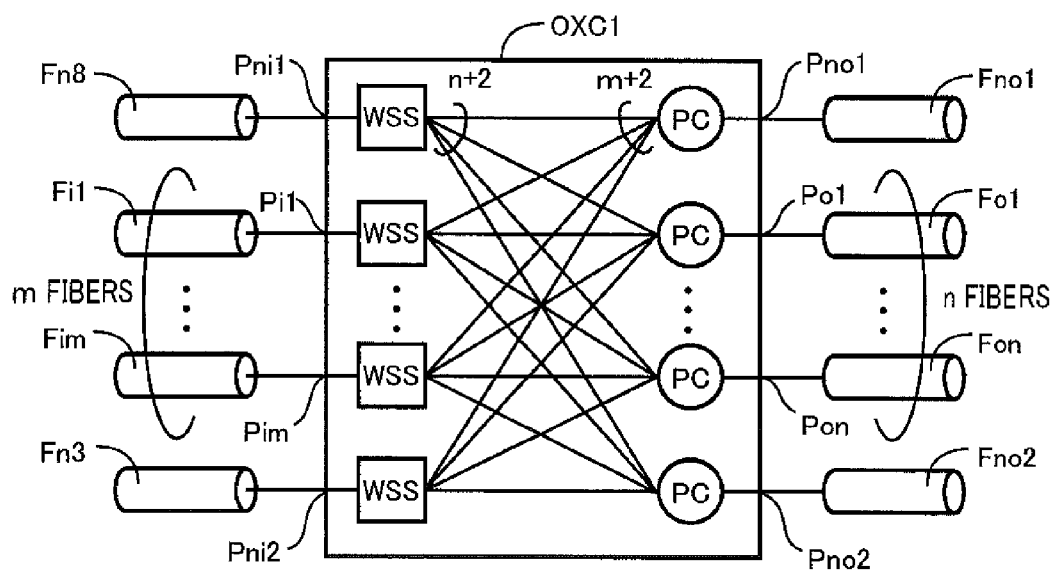
FIG. 12 is a view that illustrates another configuration example of a plurality of the optical cross-connect portions provided in the optical cross-connect apparatus, and corresponding to FIG. 3.

FIG. 12 depicts another configuration example of the optical cross-connect portion OXC1, corresponding to FIG. 3. The optical cross-connect portion OXC1 of FIG. 12 has a plurality of (m+2) 1-by-(n+2) input-side wavelength-selecting switches WSS respectively connected to the inter-node connection input ports Pi1 to Pim and the internal connection input ports Pni1 to Pni2 and receiving input wavelength division multiplexing light to select wavelengths included in the wavelength division multiplexing light, and a plurality of (n+2) 1-by-(m+2) photocouplers PC respectively connected to the inter-node connection output ports Po1 to Pon and the internal connection output ports Pno1 to Pno2 and receiving and respectively outputting the wavelengths selected by the input-side wavelength-selecting switches WSS to the inter-node connection output ports Po1 to Pon and the internal connection output ports Pno1 to Pno2. In this way, the number of expensive wavelength-selecting switches can be reduced to half as compared to the optical cross-connect portion OXC1 exemplarily illustrated in FIG. 13.

[Third Embodiment]

Figure 13:
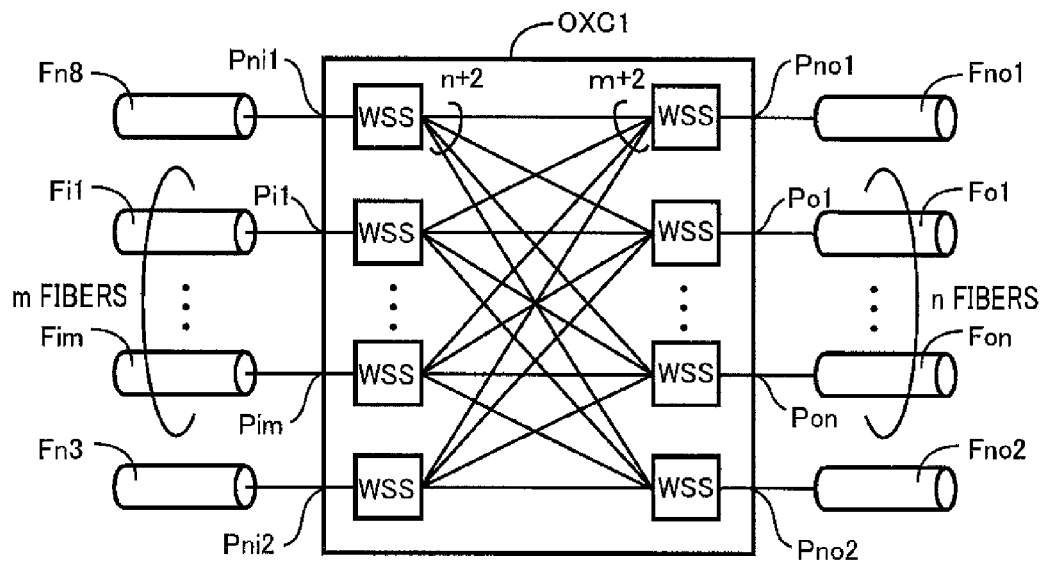
FIG. 13 is a view that illustrates another configuration example of a plurality of the optical cross-connect portions provided in the optical cross-connect apparatus, and corresponding to FIG. 3.

FIG. 13 depicts another configuration example of the optical cross-connect portion OXC1, corresponding to FIG. 3. The optical cross-connect portion OXC1 of FIG. 13 has a plurality of (m+2) 1-by-(n+2) input-side wavelength-selecting switches WSS respectively connected to the inter-node connection input ports Pi1 to Pim and the internal connection input ports Pni1 to Pni2 and receiving input wavelength division multiplexing light to select wavelengths included in the wavelength division multiplexing light, and a plurality of (n+2) 1-by-(m+2) output-side wavelength-selecting switches WSS respectively connected to the inter-node connection output ports Po1 to Pon and the internal connection output ports Pno1 to Pno2 and receiving and respectively selectively outputting the wavelengths selected by the input-side wavelength-selecting switches WSS to the inter-node connection output ports Po1 to Pon and the internal connection output ports Pno1 to Pno2. In this way, the optical loss in the optical cross-connect portion OXC1 is reduced because no photocoupler is used.

[Fourth Embodiment]

Figure 14:
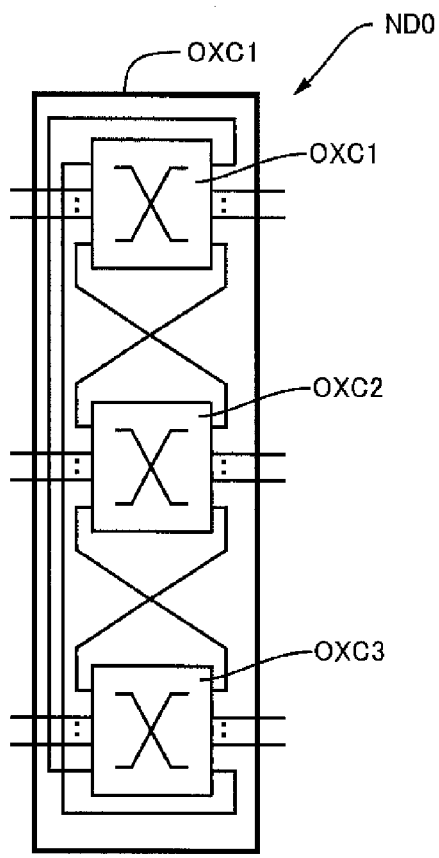
FIG. 14 is a view that illustrates an example in which the optical cross-connect apparatus is made up of a plurality of, i.e., three optical cross-connect portions.

Although the optical cross-connect apparatus OXC of FIG. 2 is made up of the four optical cross-connect portions OXC1 to OXC4, the optical cross-connect apparatus OXC can be made up of three optical cross-connect portions OXC1 to OXC3 including the same input/output ports and externally connected and interconnected in the same way as the embodiment of FIG. 2, as depicted in FIG. 14.

[Fifth Embodiment]

Figure 15:
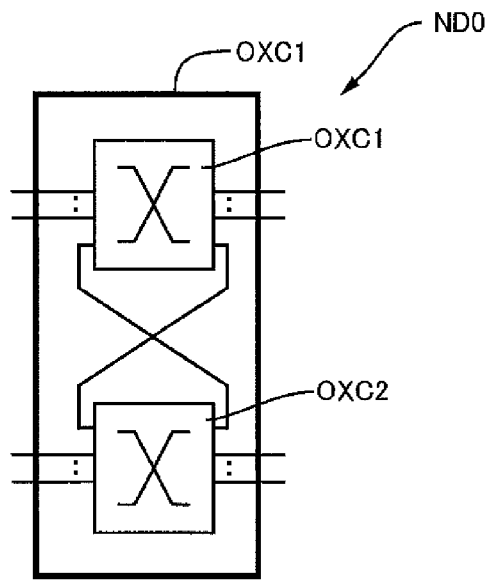
FIG. 15 is a view that illustrates an example in which the optical cross-connect apparatus is made up of a plurality of, i.e., two optical cross-connect portions.
Figure 16:
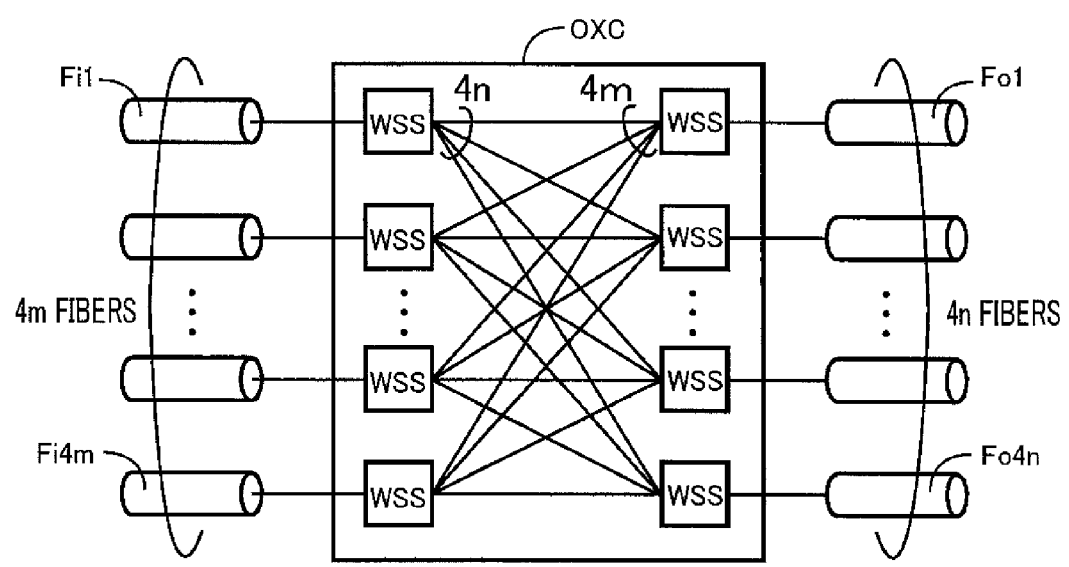
FIG. 16 is a view that illustrates the configuration of the conventional optical cross-connect apparatus that made up of a single optical cross-connect.
Figure 17:
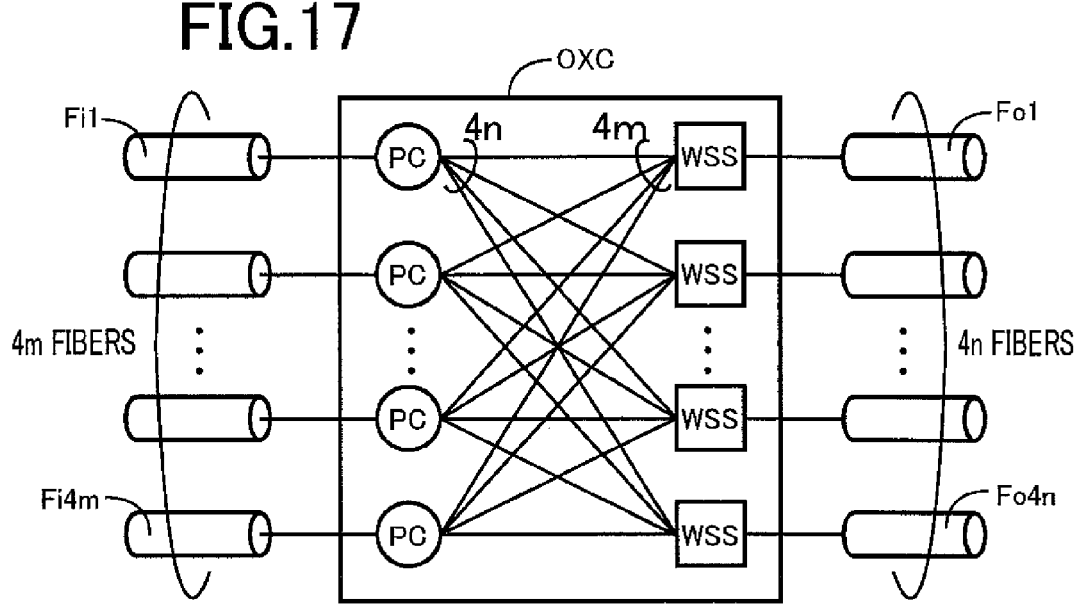
FIG. 17 is a view that illustrates the configuration of the conventional optical cross-connect apparatus that made up of a single optical cross-connect.
Figure 18:
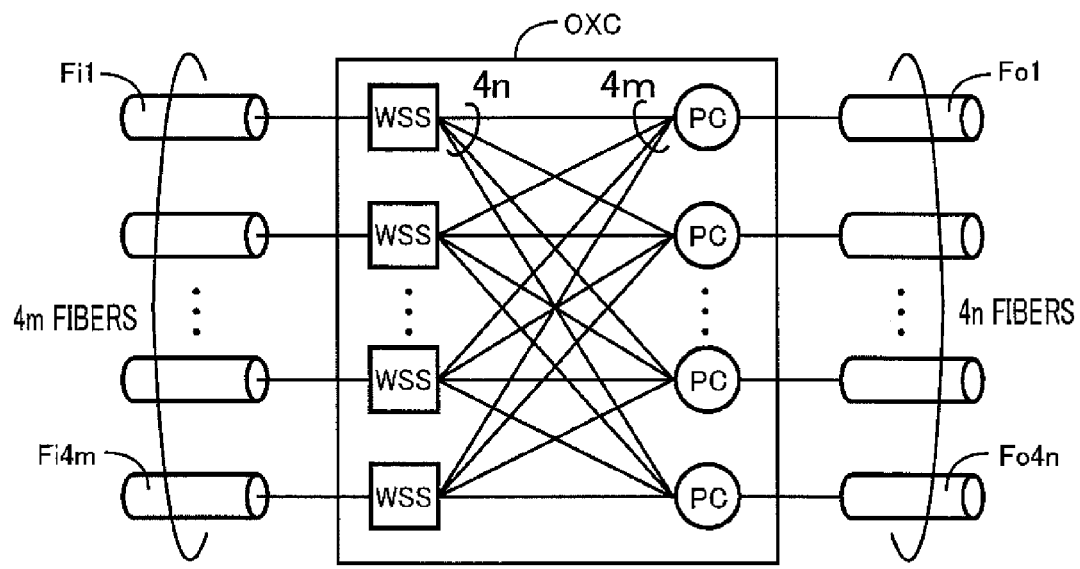
FIG. 18 is a view that illustrates the configuration of the conventional optical cross-connect apparatus that made up of a single optical cross-connect.

Although the optical cross-connect apparatus OXC of FIG. 2 is made up of the four optical cross-connect portions OXC1 to OXC4, the optical cross-connect apparatus OXC can be made up of two optical cross-connect portions OXC1 to OXC2 including the same input/output ports and externally connected and interconnected in the same way as the embodiment of FIG. 2, as depicted in FIG. 15.

Although the exemplary embodiments of the present invention have been described with reference to the drawings, the present invention is applicable in other forms.

For example, although the optical cross-connect portions OXC1 to OXC4 of the first embodiment are bidirectionally interconnected as depicted in FIG. 2, the optical cross-connect portions OXC1 to OXC4 may be unidirectionally interconnected. For example, the internal connection optical fibers Fn1, Fn3, Fn5, and Fn7, or the internal connection optical fibers Fn2, Fn4, Fn6, and Fn8 may be omitted out of the internal connection optical fibers Fn1 to Fn8. Even in this case, a wavelength output from one optical cross-connect portion of the optical cross-connect portions OXC1 to OXC4 can be input to any other optical cross-connect portions.

Although each of the internal connection optical fibers Fn1 to Fn8 is made up of a single fiber, a plurality of fibers may be used.

Although the optical cross-connect portions OXC 1 to OXC4 are internally connected via the internal connection optical fibers Fn1 to Fn8 in the first embodiment, the optical cross-connect portions OXC1 to OXC4 may be connected via three-dimensional waveguides etc.

Although the optical cross-connect apparatus OXC is made up of the four optical cross-connect portions OXC1 to OXC4 in the first embodiment, the optical cross-connect apparatus OXC may be made up of five or more optical cross-connect portions.

Although not exemplarily illustrated one by one, the present invention may variously be modified without departing from the spirit thereof.

Nomenclature of Elements

NW: optical network
OXC: optical cross-connect apparatus
OXC1-OXC4: optical cross-connect portions
WSS: wavelength-selecting switches
PC: photocouplers Fi1-Fi4m: optical input fibers (inter-node connection optical fibers)
Fo1-Fo4n: optical output fibers (inter-node connection optical fibers)
Pi1-Pim, Pim$^+$1-Pi2m, Pi2m$^+$1-Pi3m, Pi3m$^+$1-Pi4m: inter-node connection input ports
Po1-Pon, Pon$^+$-Po2 n, Po2n$^+$1-Po3n, Po3n$^+$1-Po4n: inter-node connection output ports
Pni1-Pni2, Pni3-Pni4, Pni5-Pni6, Pni7-Pni8: internal connection input ports
Pno1-Pno2, Pno3-Pno4, Pno5-Pno6, Pno7-Pno8: internal connection output ports
Fn1-Fn8 : internal connection optical fiber
G: spectral grating (spectral element)
MM: MEMS mirror
L: condensing lens

What is claimed is:

1. An optical cross-connect apparatus disposed in an optical node in an optical network with optical nodes connected to each other via each of a plurality of inter-node connection optical fibers, comprising:
a plurality of optical cross-connect portions each having an inter-node connection input port and an inter-node connection output port respectively connected to each of the plurality of the inter-node connection optical fibers, an internal connection input port, and an internal connection output port, wherein
among the plurality of inter-node connection optical fibers, each of optical input fibers connected to an input side of the optical cross-connect apparatus are directly connected to each of the inter-node connection input port of the plurality of the optical cross-connect portions, and each of optical output fibers connected to an output side of the optical cross-connect apparatus are directly connected to each of the inter-node connection output port of the plurality of the optical cross-connect portions, and wherein
for each of the plurality of the optical cross-connect portions, the internal connection output port of a predetermined optical cross-connect portion is directly connected to the internal connection input port of another optical cross-connect portion, or the internal connection output port of a predetermined optical cross-connect portion is directly connected to the internal connection input port of another optical cross-connect portion and is indirectly connected via the another optical cross-connect portion to the internal connection input port of yet another optical cross-connect portion.

2. The optical cross-connect apparatus of claim 1, wherein in a pair of optical cross-connect portions adjacent to each other out of the plurality of the optical cross-connect portions, the internal connection output port of one optical cross-connect portion is connected to the internal connection input port of the other optical cross-connect portion, and the internal connection output port of the other optical cross-connect portion is connected to the internal connection input port of the one optical cross-connect portion.

3. The optical cross-connect apparatus of claim 1, wherein the optical cross-connect apparatus is made up of two or more optical cross-connect portions.

4. The optical cross-connect apparatus of claim 2, wherein the optical cross-connect apparatus is made up of two or more optical cross-connect portions.

5. The optical cross-connect apparatus of claim 1, wherein the number of the optical cross-connect portions disposed in the optical cross-connect apparatus is identical to the number of other nodes adjacent to the optical node disposed with the optical cross-connect apparatus.

6. The optical cross-connect apparatus of claim 2, wherein the number of the optical cross-connect portions disposed in the optical cross-connect apparatus is identical to the number of other nodes adjacent to the optical node disposed with the optical cross-connect apparatus.

7. The optical cross-connect apparatus of claim 3, wherein the number of the optical cross-connect portions disposed in the optical cross-connect apparatus is identical to the number of other nodes adjacent to the optical node disposed with the optical cross-connect apparatus.

8. The optical cross-connect apparatus of claim 4, wherein the number of the optical cross-connect portions disposed in the optical cross-connect apparatus is identical to the number of other nodes adjacent to the optical node disposed with the optical cross-connect apparatus.

9. The optical cross-connect apparatus of claim 1, wherein the plurality of the optical cross-connect portions is configured by using wavelength-selecting switches having a spectral element dispersing wavelength division multiplexing light to each wavelength and a MEMS minor or a liquid crystal element receiving and selectively input a wavelength dispersed by the spectral element to any of a plurality of fibers.

10. The optical cross-connect apparatus of claim 2, wherein the plurality of the optical cross-connect portions is configured by using wavelength-selecting switches having a spectral element dispersing wavelength division multiplexing light to each wavelength and a MEMS minor or a liquid crystal element receiving and selectively input a wavelength dispersed by the spectral element to any of a plurality of fibers.

11. The optical cross-connect apparatus of claim 3, wherein the plurality of the optical cross-connect portions is configured by using wavelength-selecting switches having a spectral element dispersing wavelength division multiplexing light to each wavelength and a MEMS mirror or a liquid crystal element receiving and selectively input a wavelength dispersed by the spectral element to any of a plurality of fibers.

12. The optical cross-connect apparatus of claim 4, wherein the plurality of the optical cross-connect portions is configured by using wavelength-selecting switches having a spectral element dispersing wavelength division multiplexing light to each wavelength and a MEMS mirror or a liquid crystal element receiving and selectively input a wavelength dispersed by the spectral element to any of a plurality of fibers.

13. The optical cross-connect apparatus of claim 5, wherein the plurality of the optical cross-connect portions is configured by using wavelength-selecting switches having a spectral element dispersing wavelength division multiplexing light to each wavelength and a MEMS mirror or a liquid crystal element receiving and selectively input a wavelength dispersed by the spectral element to any of a plurality of fibers.

14. The optical cross-connect apparatus of claim 6, wherein the plurality of the optical cross-connect portions is configured by using wavelength-selecting switches having a spectral element dispersing wavelength division multiplexing light to each wavelength and a MEMS mirror or a liquid crystal element receiving and selectively input a wavelength dispersed by the spectral element to any of a plurality of fibers.

15. The optical cross-connect apparatus of claim 7, wherein the plurality of the optical cross-connect portions is configured by using wavelength-selecting switches having a spectral element dispersing wavelength division multiplexing light to each wavelength and a MEMS mirror or a liquid crystal element receiving and selectively input a wavelength dispersed by the spectral element to any of a plurality of fibers.

16. The optical cross-connect apparatus of claim 8, wherein the plurality of the optical cross-connect portions is configured by using wavelength-selecting switches having a spectral element dispersing wavelength division multiplexing light to each wavelength and a MEMS mirror or a liquid crystal element receiving and selectively input a wavelength dispersed by the spectral element to any of a plurality of fibers.

17. The optical cross-connect apparatus of claim 9, wherein the plurality of the optical cross-connect portions has a plurality of photocouplers respectively connected to the inter-node connection input port and the internal connection input port, and ouput-side wavelength-selecting switches respectively connected to the inter-node connection output port and the internal connection output port and receiving the wavelength division multiplexing light from the photocouplers to select and selectively output wavelengths included in the wavelength division multiplexing light to the inter-node connection output port and the internal connection output port.

18. The optical cross-connect apparatus of claim 9, wherein the plurality of the optical cross-connect portions has a plurality of input-side wavelength-selecting switches respectively connected to the inter-node connection input port and the internal connection input port and receiving input wavelength division multiplexing light to select wavelengths included in the wavelength division multiplexing light, and photocouplers respectively connected to the inter-node connection output port and the internal connection output port and receiving and respectively outputting wavelengths selected by the input-side wavelength-selecting switches to the inter-node connection output port and the internal connection output port.

19. The optical cross-connect apparatus of claim 9, wherein the plurality of the optical cross-connect portions has a plurality of input-side wavelength-selecting switches respectively connected to the inter-node connection input port and the internal connection input port, and ouput-side wavelength-selecting switches respectively connected to the inter-node connection output port and the internal connection output port and receiving and selectively outputting wavelengths selected by the input-side wavelength-selecting switches to the inter-node connection output port and the internal connection output port.

* * * * *